US010018894B2

(12) United States Patent
Apelt et al.

(10) Patent No.: US 10,018,894 B2
(45) Date of Patent: Jul. 10, 2018

(54) LENS CARRIER, METHOD FOR MANUFACTURING A LENS CARRIER, DEVICE FOR MANUFACTURING A LENS CARRIER, AND CAMERA SYSTEM

(71) Applicant: Robert Bosch GmbH, Stuttgart (DE)

(72) Inventors: Stefan Apelt, Weissach im Tal (DE); Stephan Geise, Ruethen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 15/317,764

(22) PCT Filed: Apr. 21, 2015

(86) PCT No.: PCT/EP2015/058579
§ 371 (c)(1),
(2) Date: Dec. 9, 2016

(87) PCT Pub. No.: WO2015/192998
PCT Pub. Date: Dec. 23, 2015

(65) Prior Publication Data
US 2017/0115550 A1    Apr. 27, 2017

(30) Foreign Application Priority Data

Jun. 18, 2014  (DE) .......................... 10 2014 211 720

(51) Int. Cl.
*G03B 17/12* (2006.01)
*B29C 45/14* (2006.01)
(Continued)

(52) U.S. Cl.
CPC ........ *G03B 17/12* (2013.01); *B29C 45/14311* (2013.01); *B29C 45/14778* (2013.01);
(Continued)

(58) Field of Classification Search
CPC ...................................................... G03B 17/12
See application file for complete search history.

(56) References Cited

U.S. PATENT DOCUMENTS 5,274,456 A * 12/1993 Izumi ................... H04N 5/2254
348/207.99
9,826,637 B2 * 11/2017 Ullmann ........... B29C 45/14639
(Continued)

FOREIGN PATENT DOCUMENTS

DE       10215100 A1    10/2003
DE    102004009920 A1     9/2005
(Continued)

OTHER PUBLICATIONS

International Search Report dated Jun. 16, 2015, issued in the underlying International Application PCT/EP2015/058579 dated Apr. 21, 2015.

*Primary Examiner* — Clayton E Laballe
*Assistant Examiner* — Dennis Hancock
(74) *Attorney, Agent, or Firm* — Norton Rose Fulbright US LLP; Gerard Messina

(57) ABSTRACT

A lens carrier for a camera system of a surroundings detection system of a motor vehicle including a printed circuit foil, tracks being applied as conductors or resistors to a first side of the printed circuit foil, and a plastic material being injection-molded onto a second side of the printed circuit foil situated opposite the first side. A corresponding method for manufacturing a lens carrier, device for manufacturing a lens carrier, and a camera system for a surroundings detection system of a motor vehicle, are also described.

16 Claims, 2 Drawing Sheets

(51) Int. Cl.
*H04N 5/225* (2006.01)
*B60R 11/04* (2006.01)

(52) U.S. Cl.
CPC ............ *B60R 11/04* (2013.01); *H04N 5/2253* (2013.01); *H04N 5/2254* (2013.01); *B29C 2045/14885* (2013.01)

(56) References Cited

U.S. PATENT DOCUMENTS

2003/0145940 A1\* 8/2003 Chaudhury ................ C09J 5/02
  156/272.6
2009/0229417 A1\* 9/2009 Shepard .................. B21D 37/01
  76/101.1
2012/0307461 A1\* 12/2012 Liskow .................. H05K 3/281
  361/749
2014/0024736 A1   1/2014 Thomas et al.
2014/0242736 A1\* 8/2014 Dickey ................. H01L 23/291
  438/26

FOREIGN PATENT DOCUMENTS

DE   102011005629 A1   9/2012
EP       1717011 A1    11/2006

\* cited by examiner

LENS CARRIER, METHOD FOR MANUFACTURING A LENS CARRIER, DEVICE FOR MANUFACTURING A LENS CARRIER, AND CAMERA SYSTEM

FIELD

The present invention relates to a lens carrier for a camera system of a surroundings detection system of a motor vehicle, to a method for manufacturing a lens carrier, to a device for manufacturing a lens carrier, and to a camera system for a surroundings detection system of a motor vehicle.

BACKGROUND INFORMATION

Conventional camera systems are used in surroundings detection systems of vehicles. The optical systems detect the vehicle surroundings and supply pieces of information for further vehicle systems. In addition to detecting the front or rear area of the vehicle, special types are available, for example, which supply pieces of information when driving at night or monitor the traffic lane of the driver.

The camera systems are composed of a lens carrier including a lens system made up of multiple lenses and an image sensor. The lens carrier is manufactured as standard from specially reinforced polymeric plastic materials, which due to high tolerance requirements in regard to the dimensional and positioning accuracy have an accordingly high purchase price. At the same time, these materials are difficult to process. During assembly of the camera system, care must be taken that the lens carrier, including the lens system, is oriented toward the image sensor since only then it is ensured that the image sensor detects the correct image.

German Patent Application No. DE 10 2004 009 920 A1 describes a camera system, in particular for a surroundings detection system of a motor vehicle, including a holding frame for mounting a lens carrier, whose lens system is used to guide incident light onto an image sensor. The holding frame includes a support surface for the lens carrier which is situated largely in parallel to the plane of the image sensor, and the lens carrier is displaceable in the plane of the support surface in an adjustment position, and permanently fixable in a setpoint position.

SUMMARY

The present invention provides a lens carrier for a camera system of a surroundings detection system of a motor vehicle including a polymeric printed circuit foil, tracks being applied as conductors or resistors to a first side of the polymeric printed circuit foil, and a thermosetting plastic material being injection-molded onto a second side of the polymeric printed circuit foil situated opposite the first side.

The present invention furthermore provides a method for manufacturing a lens carrier. The method includes arranging a polymeric printed circuit foil in an injection mold of an injection molding machine, tracks being applied as conductors or resistors to a first side of the polymeric printed circuit foil. The method further includes fixing of the polymeric printed circuit foil in the injection mold and injecting a thermosetting plastic material into a cavity of the injection mold for injection molding the thermosetting plastic material onto a second side of the polymeric printed circuit foil situated opposite the first side.

The present invention furthermore provides a device for manufacturing the lens carrier according to the present invention. The device includes an injection molding machine having an injection mold, and a roll-to-roll system, which is designed to guide the polymeric printed circuit foil through the injection mold.

The present invention moreover provides a camera system for a surroundings detection system of a motor vehicle. The camera system includes the lens carrier according to the present invention, an image sensor provided in the area of an opening of the polymeric printed circuit foil, and a lens system, which is situated in the lens carrier and guides incident light onto the image sensor.

In accordance with the present invention, a lens carrier for a camera system of a surroundings detection system is manufactured by back injection molding foil-based circuits with a plastic material. The polymeric printed circuit foil, onto which the thermosetting plastic material is injection molded, has a high heat resistance. The high heat resistance of the polymeric printed circuit foil has the advantage that thermosetting plastic materials having particularly advantageous material properties may be used. Since the thermosetting material has a low viscosity in the injection mold, a low injection pressure suffices to mold the lens carrier.

Advantageous specific embodiments and refinements are derived from the description herein with reference to the figures.

Preferably, it is provided that the polymeric printed circuit foil is formed by a polyimide foil, which is heat-resistant up to a temperature of 200° C. By using a thermosetting plastic material in conjunction with the high temperature resistant polymeric printed circuit foil, a low injection pressure suffices to mold the component, due to the low viscosity of the thermosetting material. The foil thus undergoes only very little loading, so that the existing circuits are not damaged.

Preferably, it is furthermore provided that the thermosetting plastic material may be an epoxy resin, a phenolic compound or a bulk molding compound. Compared to a polymeric material, the bulk molding compound always has a lower price per kilogram. Since the thermosetting material has a low viscosity in the injection mold, a low injection pressure suffices to mold the lens carrier. The polymeric printed circuit foil thus undergoes only very little loading, so that the existing circuits are not damaged. Due to a positive shrinkage of the bulk molding compound in the injection mold, the polymeric printed circuit foil is pressed against a mold wall, and thus very precise shape and positioning tolerance ranges for the optical orientation are reproducibly molded. After the thermosetting compound has hardened, the lens carrier has a very high dimensional and shape stability, even at a high temperature or humidity, and may permanently ensure an optical function. A further advantage of the high dimensional stability of the material is the option that the lens system may be pressed directly into the lens carrier, and thus an additional component and manufacturing step may be eliminated.

According to one further preferred exemplary embodiment, it is provided that the second side of the polymeric printed circuit foil is treated with plasma, provided with a laser structure, or that a holding primer is applied to the second side of the polymeric printed circuit foil. In this way, better adhesion may be achieved between a thermosetting compound and the thermoplastic foil.

According to one further preferred embodiment, it is provided that an adhesive layer is applied to the second side of the polymeric printed circuit foil, to improve the bonding strength between the polymeric printed circuit foil and the plastic material which is injection-molded onto the polymeric printed circuit foil. In this way, the bonding strength may be improved to a necessary degree, if the selected material pairing between the polymeric printed circuit foil and the thermosetting plastic material does not have sufficient strength.

According to a further preferred exemplary embodiment, it is provided that the polymeric printed circuit foil is guided from roll to roll through the injection mold and cut to size with the aid of a punching device integrated into the injection mold. By deliberately integrating functions during the manufacture of the lens carrier, it is possible to reduce a cost expenditure for labor and equipment and a time expenditure for the manufacture of the lens carrier.

Preferably, it is provided that an opening for providing an image sensor is introduced into the polymeric printed circuit foil with the aid of the punching device integrated into the injection mold, and the polymeric printed circuit foil is fixed in the injection mold with the aid of the punching device and centering pins. The cutting to size of the polymeric printed circuit foil assembled from roll to roll thus takes place completely in one injection mold, and also only on one injection molding machine. The guiding of the foil from roll to roll allows handling suitable for series production and, when using additional pins, an exact positioning of the assembled components. Since all process steps take place in one injection mold, almost no sources of defects are created, such as a misalignment, soiling on the foil, and the like, and it is possible to adhere to the high optical tolerance requirements.

According to one further preferred exemplary embodiment, it is provided that the second side of the polymeric printed circuit foil is treated with plasma, provided with a laser structure, or that a holding primer is applied to the second side of the polymeric printed circuit foil. In this way, better adhesion may be achieved between the thermosetting compound and the thermoplastic foil.

According to a further preferred embodiment, it is provided that the injection mold is heated to a temperature of 120° C. to 200° C., preferably to a temperature of 120° C. to 160° C. By using a thermosetting plastic material in conjunction with a high temperature resistant polymeric printed circuit foil, a low injection pressure suffices to mold the component, due to the low viscosity of the thermosetting material. The foil thus undergoes only very little loading, so that the existing circuits are not damaged.

Preferably, it is furthermore provided that an adhesive layer is applied to the second side of the polymeric printed circuit foil, to improve the bonding strength between the polymeric printed circuit foil and the plastic material which is injection-molded onto the polymeric printed circuit foil. In this way, the bonding strength may be improved to a necessary degree, if the selected material pairing between the polymeric printed circuit foil and the thermosetting plastic material does not have sufficient strength.

According to one further preferred exemplary embodiment, it is provided that the injection mold is formed of a tool steel having a chromium content of at least 10%, and a punching device for introducing an opening into the polymeric printed circuit foil is integrated into the injection mold.

The cutting to size of the polymeric printed circuit foil assembled from roll to roll thus takes place completely in one injection mold, and also only on one injection molding machine. The guiding of the foil from roll to roll allows handling suitable for series production and, when using additional pins, an exact positioning of the assembled components. Since all process steps take place in one injection mold, almost no sources of defects are created, such as a misalignment, soiling on the foil, and the like, and it is possible to adhere to the high optical tolerance requirements.

According to one further preferred embodiment, it is provided that the injection mold includes means for heating the injection mold to a temperature of 120° C. to 200° C., preferably to a temperature of 120° C. to 160° C. By using a thermosetting plastic material in conjunction with a high temperature resistant polymeric printed circuit foil, a low injection pressure suffices to mold the component, due to the low viscosity of the thermosetting material. The foil thus undergoes only very little loading, so that the existing circuits are not damaged.

The described embodiments and refinements may be arbitrarily combined with each other.

Further possible embodiments, refinements and implementations of the present invention also include not explicitly described combinations of features of the present invention which are described at the outset or hereafter with respect to the exemplary embodiments.

BRIEF DESCRIPTION OF THE DRAWINGS

The accompanying drawings are intended to provide a further understanding of the specific embodiments of the present invention. They illustrate specific embodiments and, in conjunction with the description, are used to explain the present invention.

Other specific embodiments and many of the described advantages result with respect to the figures. The shown elements and designations are not necessarily illustrated true to scale in relation to each other.

DETAILED DESCRIPTION OF EXAMPLE EMBODIMENTS

Figure 1:
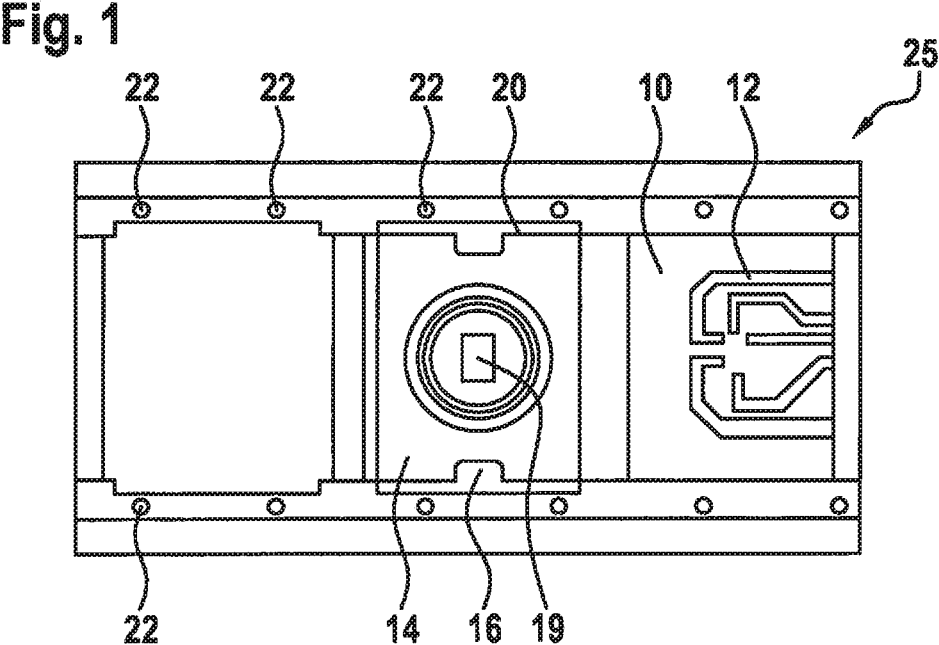
FIG. 1 shows a perspective view of a device according to the present invention for manufacturing a lens carrier according to a preferred specific embodiment of the present invention.

In the figures, identical reference numerals denote identical or functionally equivalent elements, parts or components, unless indicated otherwise.

FIG. 1 shows a perspective view of a device according to the present invention for manufacturing a lens carrier according to a preferred specific embodiment of the present invention.

A printed circuit foil 10 is guided in a roll-to-roll system 25 through an injection mold in an injection molding machine. The printed circuit foil is fixed in the injection mold with the aid of a punching device (not shown in FIG. 1) and a multitude of centering pins 22. Tracks 12 are applied as conductors or resistors to a first side of the printed circuit foil. Printed circuit foil 10 is formed by a polymeric material, preferably polyimide. Alternatively, printed circuit foil 10 may also be formed of another suitable material. Printed circuit foil 10 is positioned in injection mold 16, and thereafter a plastic material 14 is injection-molded onto printed circuit foil 10. Plastic material 14 is preferably formed by a thermosetting plastic material, preferably a bulk molding compound. Alternatively, the thermosetting plastic material may also be formed by an epoxy resin or a phenolic compound. A lens carrier 20 is formed by injection molding plastic material 14 onto printed circuit foil 10. A punching device (not shown in FIG. 1) is integrated into injection mold 16 and used to introduce an opening 19 into printed circuit foil 10.

During the injection molding of plastic material 14 onto printed circuit foil 10, the punching device is situated in opening 19, so that plastic material 14 is also injection-molded onto the punching device. The manufactured lens carrier 20 thus has opening 19 in the area of printed circuit foil 10 and of hardened plastic material 14.

Figure 2:
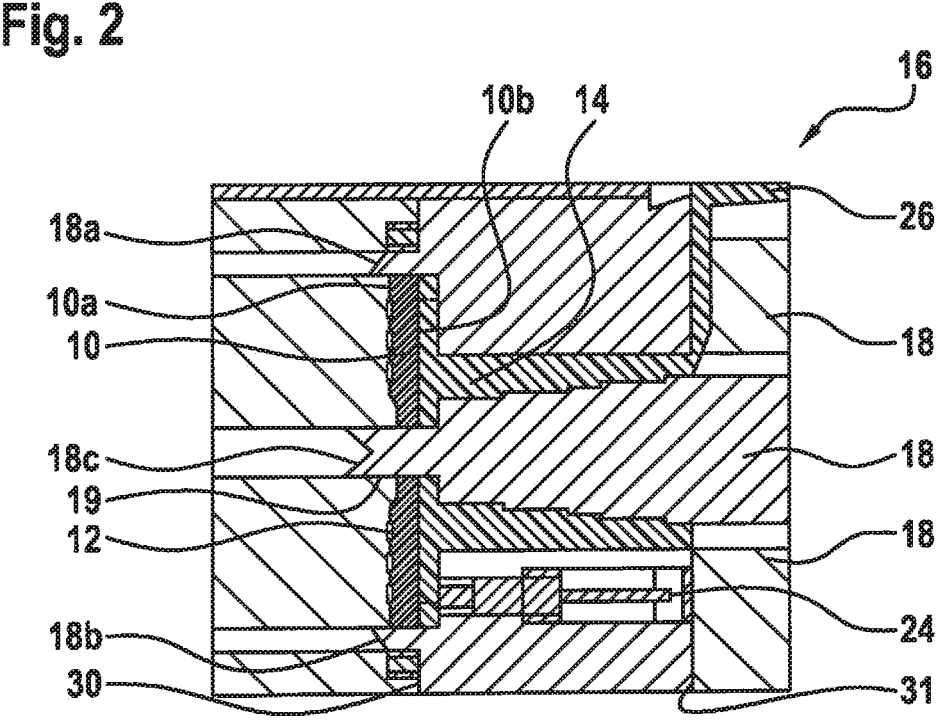
FIG. 2 shows a sectional view of an injection mold according to the present invention of an injection molding machine for manufacturing the lens carrier according to the preferred specific embodiment of the present invention.

FIG. 2 shows a sectional view of an injection mold according to the present invention in an injection molding machine for manufacturing the lens carrier according to the preferred specific embodiment of the present invention.

Injection mold 16 is shown in the closed state in FIG. 2. Printed circuit foil 10 is inserted into injection mold 16 and positioned in such a way that a predetermined section of printed circuit foil 10 is situated in the area of injection mold 16. Tracks 12 are applied as conductors or resistors to first side 10*a* of printed circuit foil 10. Plastic material 14 is injection-molded onto second side 10*b* of printed circuit foil 10 situated opposite the first side.

In the present exemplary embodiment, the printed circuit foil is formed by a polymeric foil, in particular a polyimide foil. The polyimide foil is heat-resistant up to a temperature of 160° C. in the present exemplary embodiment. Alternatively, the polyimide foil may also be heat-resistant up to a temperature of 200° C. Printed circuit foil 10 is fixed in injection mold 16 with the aid of a punching device 18 and centering pins (not shown in FIG. 2). Punching device 18 includes a multitude of punching edges. Punching device 18 includes a first punching edge 18*a* in a first edge area of injection mold 16 and a second punching edge 18*b* in a second edge area of injection mold 16. First punching edge 18*a* and second punching edge 18*b* are used to punch out particular edge areas of printed circuit foil 10. In this way, corresponding edge areas of manufactured lens carrier 20 also have congruent recesses.

Punching device 18 has a third punching edge 18*c* in a central area of injection mold 16. Third punching edge 18*c* is designed to introduce opening 19 into a central area of printed circuit foil 10. Manufactured lens carrier 20 thus also has a congruent opening in a central area.

Injection mold 16 also includes a pressure sensor, which transmits instantaneous values to a machine controller for regulating the injection pressure. Plastic material 14 is injected into injection mold 16 via a sprue 26.

After a predefined hardening time, a parting plane 30 of two-plate injection mold 16 is opened, and finished lens carrier 20 is ejected from the cavity. A drawback element on the outside of the injection mold is used to open a second parting plane 31 during another opening step, and sprue 26 is removed.

Figure 3:
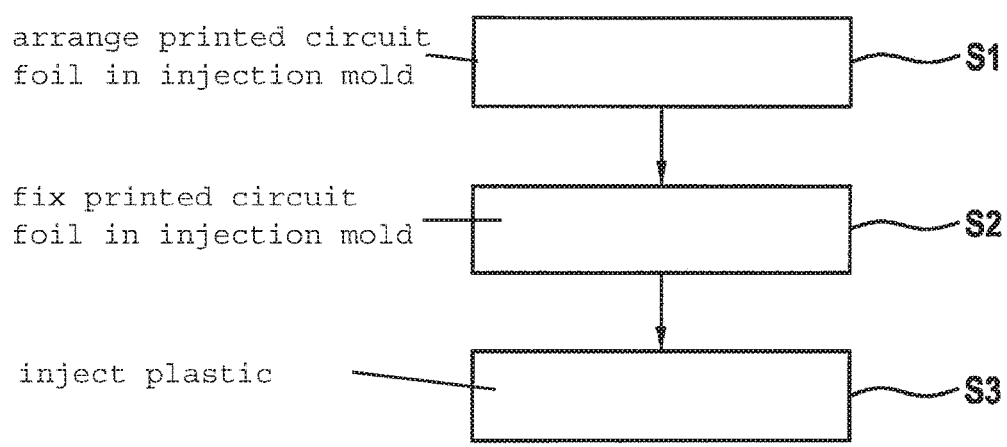
FIG. 3 shows a flow chart of a method for manufacturing the lens carrier according to the present invention according to the preferred specific embodiment of the present invention.

FIG. 3 shows a flow chart of a method for manufacturing the lens carrier according to the present invention according to the preferred specific embodiment of the present invention.

In a first step S1, a printed circuit foil 10 is arranged in an injection mold 16 of an injection molding machine, tracks 12 being applied as conductors or resistors to a first side 10*a* of printed circuit foil 10. In a second step S2, printed circuit foil 10 is fixed in injection mold 16. In a third step S3, a plastic material 14 is injected into a cavity of injection mold 16 for injection molding plastic material 14 onto a second side 10*b* of printed circuit foil 10 situated opposite first side 10*a*, the printed circuit foil being heat-resistant up to a temperature of 160° C. Alternatively, printed circuit foil 10 may also be heat-resistant up to a temperature of 200° C.

For better adhesion between plastic material 14 and printed circuit foil 10, second side 10*b* of printed circuit foil 10 may be pretreated immediately prior to the insert molding with plasma. Alternatively, the printed circuit foil may also be provided with a laser structure, or a holding primer may be applied to second side 10*b* of printed circuit foil 10. In the present exemplary embodiment, plastic material 14 is formed by a thermosetting plastic material, preferably by a bulk molding compound. Alternatively, the plastic material may also be formed by an epoxy resin or a phenolic compound. The cross-linking of thermosetting plastic material 14 begins with the injection process into heated injection mold 16. The cavity pressure reaches a maximum value of 40 bar. In this way, the circuit applied to printed circuit foil 10 is not damaged.

During the injection, the reactive thermosetting compound comes in contact with a surface of printed circuit foil 10 and joins physically and chemically with the same, whereby a durable joint is created. Positive mold shrinkage of thermosetting plastic material 14 optimally shapes lens carrier 20.

The cutting to size of printed circuit foil 10 assembled from roll to roll and the injection-molding or back injection molding of printed circuit foil 10 take place completely in one injection mold 16, and also only in one injection molding machine. The guiding of printed circuit foil 10 from roll to roll allows handling suitable for series production and, when using centering pins 22, an exact positioning of assembled printed circuit foil 10 in injection mold 16.

Due to the roll motion, printed circuit foil 10 is offset by one position prior to or after the injection process, and both parting planes of injection mold 16 are closed. Alternatively, a fully assembled foil may be inserted into the opened injection mold with the aid of foil handling. An orientation of printed circuit foil 10 takes place via centering pins 22 in injection mold 16. In a subsequent process step, the lens system is positioned in lens carrier 20, and an image sensor is glued onto printed circuit foil 10.

Although the present invention has been described above based on preferred exemplary embodiments, it is not limited thereto, but is modifiable in a variety of ways. The present invention may in particular be changed or modified in multiple ways without departing from the core of the present invention.

For example, lens carrier 20 may also be used for another camera system within the scope of a surroundings detection system of rail vehicles or aircraft or in the field of buildings.

What is claimed is:

1. A lens carrier for a camera system of a surroundings detection system of a motor vehicle, comprising:
   a polymeric printed circuit foil, tracks being applied as conductors or resistors to a first side of the polymeric printed circuit foil; and
   a thermosetting plastic material injection-molded onto a second side of the polymeric printed circuit foil situated opposite the first side, the polymeric printed circuit foil, together with the thermosetting plastic material, being the lens carrier;
   wherein the lens carrier includes an opening extending through the polymeric printed circuit foil and the thermosetting plastic material, and the thermoplastic material is molded to hold a lens system over the opening.

2. The lens carrier as recited in claim 1, wherein the polymeric printed circuit foil is a polyimide foil, which is heat-resistant up to a temperature of 200° C.

3. The lens carrier as recited in claim 1, wherein the thermosetting plastic material is formed by one of an epoxy resin, a phenolic compound or a bulk molding compound.

4. The lens carrier as recited in claim 1, wherein at least one of: i) the second side of the polymeric printed circuit foil is treated with plasma, ii) the second side of the polymeric printed circuit foil is provided with a laser structure, or iii) a holding primer is applied to the second side of the polymeric printed circuit foil.

5. The lens carrier as recited in claim 1, wherein an adhesive layer is applied to the second side of the polymeric printed circuit foil to improve the bonding strength between the polymeric printed circuit foil and the plastic material which is injection molded onto the polymeric printed circuit foil.

6. A method for manufacturing a lens carrier, comprising:
arranging a polymeric printed circuit foil in an injection mold of an injection molding machine, tracks being applied as conductors or resistors to a first side of the polymeric printed circuit foil;
fixing the polymeric printed circuit foil in the injection mold; and
injecting a thermosetting plastic material into a cavity of the injection mold and injection molding the thermosetting plastic material onto a second side of the polymeric printed circuit foil situated opposite the first side, the polymeric printed circuit foil, together with the thermosetting plastic material, being the lens carrier;
wherein the lens carrier includes an opening extending through the polymeric printed circuit foil and the thermosetting plastic material, and the thermoplastic material is molded to hold a lens system over the opening.

7. The method as recited in claim 6, wherein the polymeric printed circuit foil is guided from roll to roll through the injection mold and cut to size with the aid of a punching device integrated into the injection mold.

8. The method as recited in claim 7, wherein an opening for providing an image sensor is introduced into the polymeric printed circuit foil with the aid of the punching device integrated into the injection mold, the polymeric printed circuit foil being fixed in the injection mold with the aid of the punching device and centering pins.

9. The method as recited in claim 6, wherein at least one of: i) the second side of the polymeric printed circuit foil is treated with plasma, ii) the second side of the polymeric printed circuit foil is provided with a laser structure, or iii) a holding primer is applied to the second side of the polymeric printed circuit foil.

10. The method as recited in claim 6, wherein the injection mold is heated to a temperature of 120° C. to 200° C.

11. The method as recited in claim 6, wherein the injection mold is heated to a temperature of 120° C. to 160° C.

12. The method as recited in claim 6, wherein an adhesive layer is applied to the second side of the polymeric printed circuit foil to improve the bonding strength between the polymeric printed circuit foil and the plastic material which is injection-molded onto the polymeric printed circuit foil.

13. A device for manufacturing a lens carrier, comprising:
an injection molding machine which includes an injection mold, the mold to receive a polymeric printed circuit foil, tracks being applied as conductors or resistors to a first side of the polymeric printed circuit foil, a cavity of the injection mold configured to receive an injection of a thermosetting plastic material for injection molding the thermosetting plastic material onto a second side of the polymeric printed circuit foil situated opposite the first side, the polymeric printed circuit foil, together with the thermosetting plastic material, being the lens carrier; and
a roll-to-roll system, which is designed to guide the polymeric printed circuit foil through the injection mold
wherein the injection molding machine form the lens carrier to include an opening extending through the polymeric printed circuit foil and the thermosetting plastic material, and the thermoplastic material is molded to hold a lens system over the opening.

14. The device as recited in claim 13, wherein the injection mold is formed of a tool steel having a chromium content of at least 10%, a punching device for introducing the opening into the polymeric printed circuit foil being integrated into the injection mold.

15. The device as recited in claim 13, wherein the injection molding machine includes a heater to heat the injection mold to a temperature of 120° C. to 200° C.

16. The device as recited in claim 13, wherein the injection molding machine includes a heater to heat the injection mold to a temperature of 120° C. to 160° C.

* * * * *